US011497589B2

(12) United States Patent
Kuo

(10) Patent No.: US 11,497,589 B2
(45) Date of Patent: Nov. 15, 2022

(54) MANUAL AND ELECTRIC PUMP TOOTHBRUSHES WITH TOOTHPASTE TUBE

(71) Applicant: Youti Kuo, Penfield, NY (US)

(72) Inventor: Youti Kuo, Penfield, NY (US)

(\*) Notice: Subject to any disclaimer, the term of this patent is extended or adjusted under 35 U.S.C. 154(b) by 0 days.

(21) Appl. No.: 17/618,036

(22) PCT Filed: Oct. 7, 2019

(86) PCT No.: PCT/US2019/055013
§ 371 (c)(1),
(2) Date: Dec. 10, 2021

(87) PCT Pub. No.: WO2020/256761
PCT Pub. Date: Dec. 24, 2020

(65) Prior Publication Data
US 2022/0218455 A1    Jul. 14, 2022

Related U.S. Application Data

(60) Provisional application No. 62/862,021, filed on Jun. 15, 2019.

(51) Int. Cl.
*A61C 17/22* (2006.01)
*A46B 11/00* (2006.01)
*A61C 17/34* (2006.01)

(52) U.S. Cl.
CPC ........ *A61C 17/227* (2013.01); *A46B 11/0041* (2013.01); *A46B 11/0065* (2013.01); *A61C 17/3436* (2013.01); *A46B 2200/1066* (2013.01)

(58) Field of Classification Search
CPC .. A46B 11/00; A46B 11/0041; A46B 11/0051

USPC ........................................... 15/104.94
See application file for complete search history.

(56) References Cited

U.S. PATENT DOCUMENTS

| | | | | |
|---|---|---|---|---|
| 3,712,747 A | * | 1/1973 | Drohomirecky | A46B 7/046 401/155 |
| 5,301,381 A | * | 4/1994 | Klupt | A46B 13/04 15/22.1 |
| 2007/0041779 A1 | * | 2/2007 | Kuo | A61C 17/227 401/270 |

\* cited by examiner

*Primary Examiner* — Michael D Jennings
*Assistant Examiner* — Aaron R McConnell
(74) *Attorney, Agent, or Firm* — McClure, Qualey & Rodack, LLP

(57) ABSTRACT

A pump toothbrush having a toothpaste tube to dispense dentifrice material to top of bristle head is disclosed. The pump toothbrush has a pump head with a resilient button to create an internal vacuum force to draw the dentifrice material from the toothpaste tube. The toothpaste tube is supported by width-limiting fingers to prevent total collapsing of sidewalls resulting in blocking of its flow channel. A self-closing spout is used for preventing backflow. For a manual pump toothbrush the toothpaste tube has an oval-shaped shoulder for mating with the oval-shaped shoulder of a detachable handle for fastening the toothpaste tube by threads. For an electrical pump toothbrush, a detachable endcap connector is used for swinging out the toothpaste tube from its handle for replacement. A sonic vibration model uses rubber molding to minimize vibration on the handle. A dual-rotary model has two rotary bristle elements engaged by gear teeth.

16 Claims, 13 Drawing Sheets

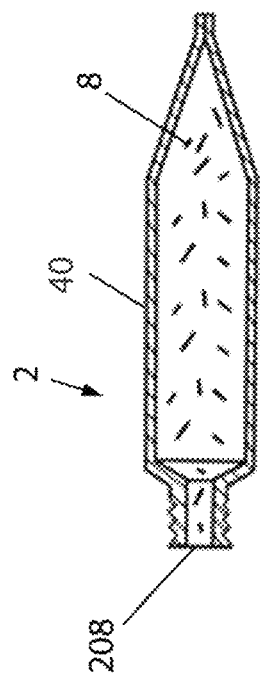
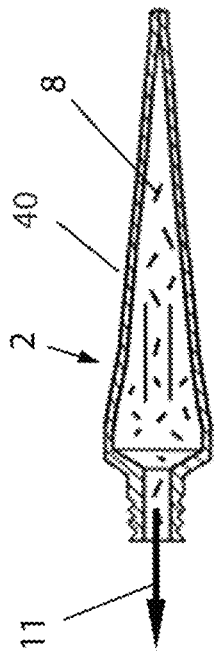
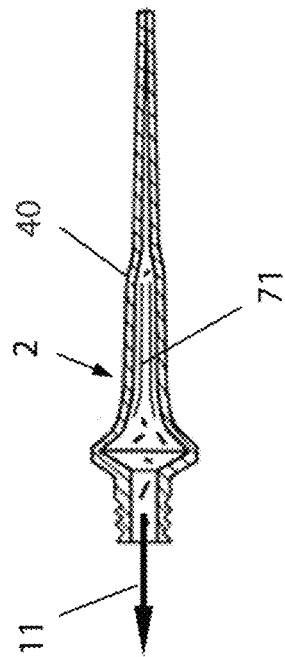
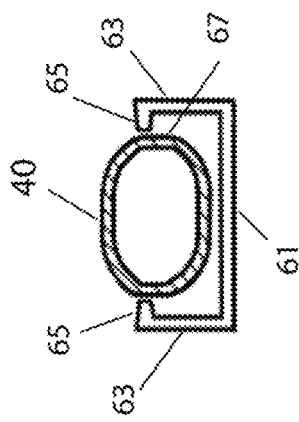
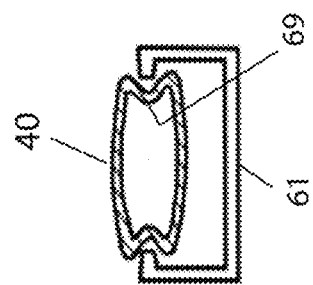
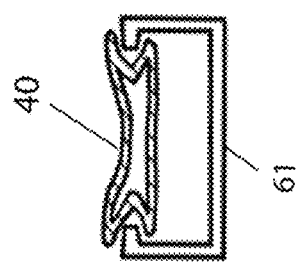
FIG. 3a
FIG. 3b
FIG. 3c

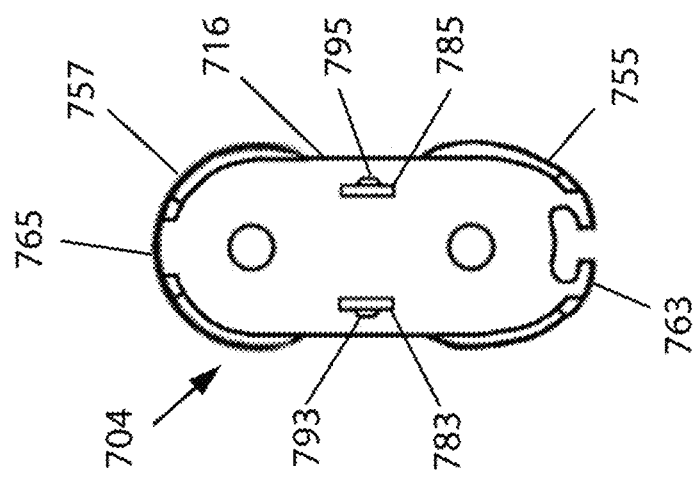
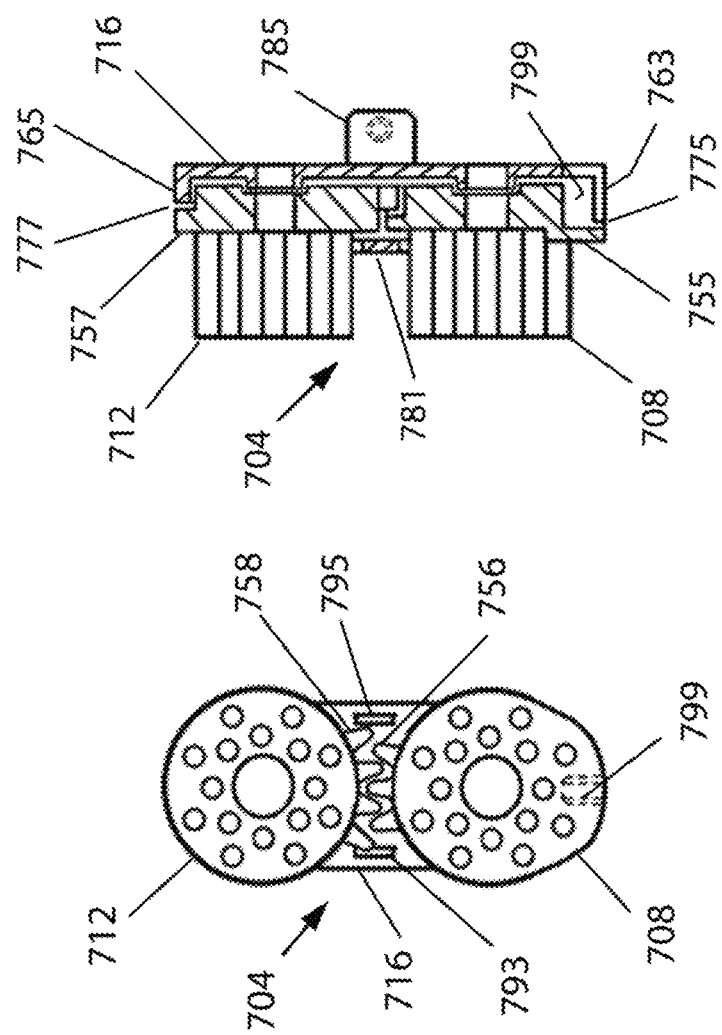
FIG. 10b
FIG. 10a

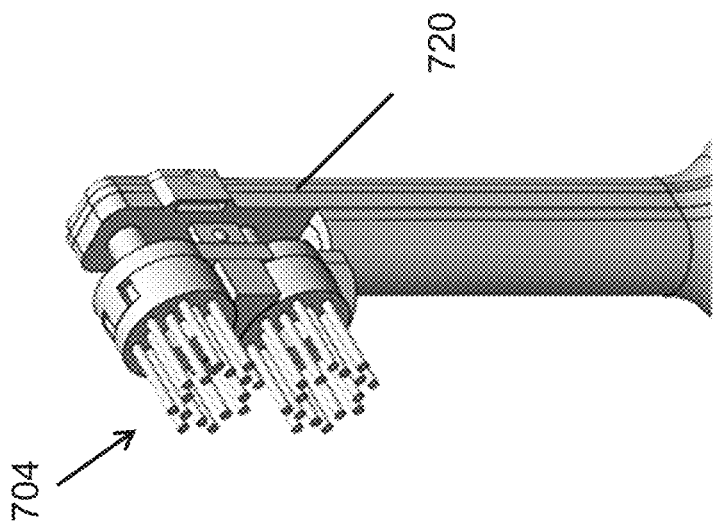
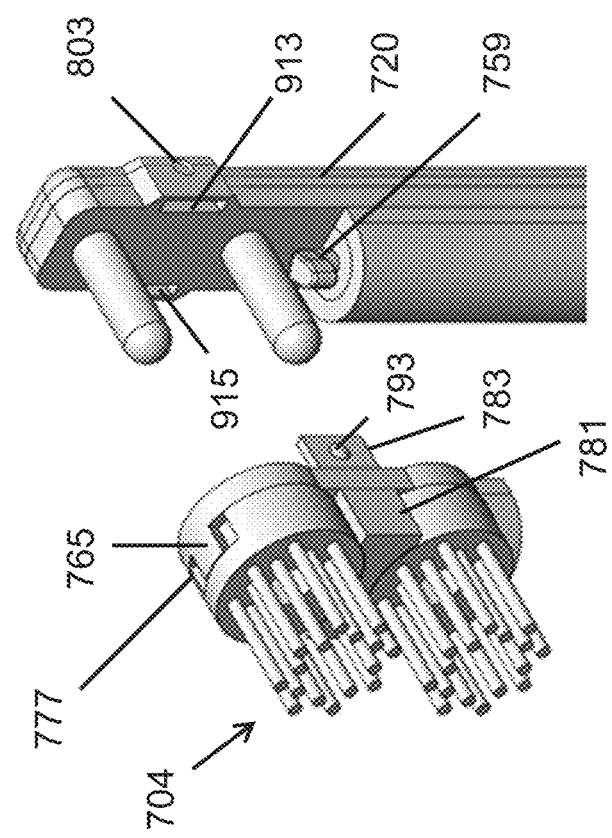
FIG. 12b
FIG. 12a

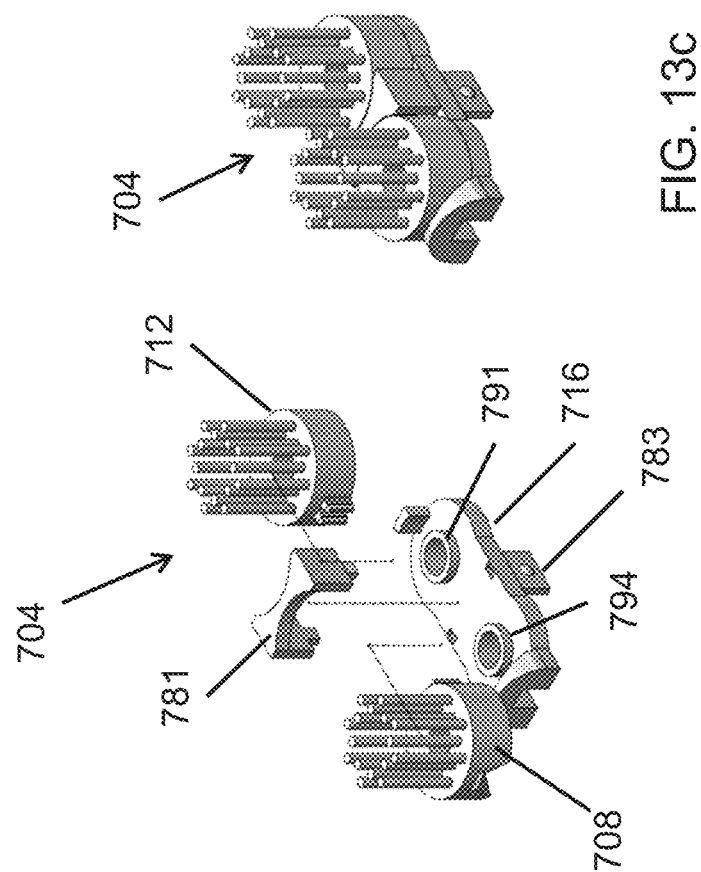
FIG. 13c
FIG. 13b
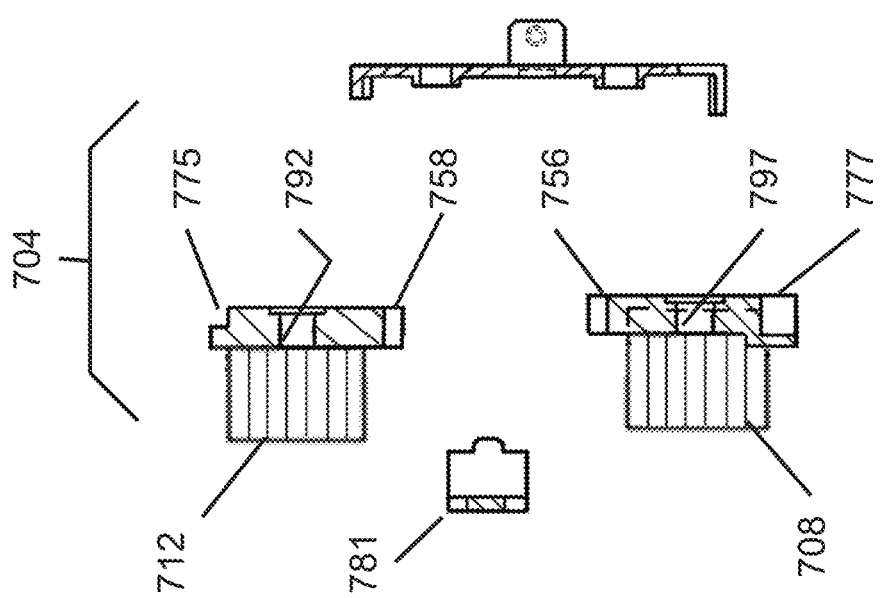
FIG. 13a

MANUAL AND ELECTRIC PUMP
TOOTHBRUSHES WITH TOOTHPASTE
TUBE

CROSS-REFERENCE TO RELATED APPLICATION

This is a 371 of PCT Patent Application Serial No. PCT/US2019/055013 filed on Oct. 7, 2019, which claims priority to U.S. Provisional patent Application Ser. No. 62/862,021, filed on Jun. 15, 2019, which is incorporated herein by reference.

BACKGROUND OF THE INVENTION

Field of the Invention

This invention relates to a pump toothbrush creating an internal vacuum force to dispense dentifrice material from a toothpaste tube to top of bristle head through a self-closing spout.

Description of the Related Art

A conventional toothbrush consists of a brush head and a handle connecting to the brush head in one unit. In using such a conventional toothbrush, toothpaste is dispensed externally from a toothpaste tube to the top of the brush head by using two hands, with one hand holding the toothbrush and the other hand squeezing on the toothpaste tube. The toothpaste dispensing action requires two hands. Moreover, the toothpaste sitting on top of the bristles is prone to fall off during brushing. Toothpaste falling off onto sink is a frequent problem for young children learning to apply toothpaste on top of the bristles. Even for adults, it is a significant challenge to keep toothpaste on the brush head as the brushing actions tend to shake off the toothpaste, which is not fully anchored on the bristles.

In prior art, there have been many toothpaste-dispensing toothbrushes which dispense toothpaste internally from a toothpaste reservoir in a handle to the brush head through an aperture in the brush head. Most of these toothpaste-dispensing toothbrushes use threaded cartridges to advance the toothpaste and require two hands to dispense the toothpaste except a kind of pump toothbrush that uses a push button and a cartridge containing a piston to move the toothpaste forward. In all these toothpaste-dispensing toothbrushes, the toothpaste cartridges are of special design that are of higher manufacturing costs. Therefore, it is desirable to have a toothpaste-dispensing toothbrush that dispenses toothpaste internally to the brush head with one hand from a conventional type of toothpaste tube, which consists of a threaded top outlet with a rigid shoulder supporting collapsible side wall having a sealed bottom end.

Furthermore, a conventional sonic electrical toothbrush has a motor supported in the handle without reducing vibration in the handle. And a conventional oscillation electrical toothbrush is limited to using one rotary bristle element. Such a single rotary brush head limits the brushing efficiency as it takes much more time to clean all the teeth in the mouth in comparison with a long brush head.

U.S. Pat. No. 5,028,158 by Fey describes a toothbrush with means for attaching a toothpaste tube. The toothbrush has an upper cover for enclosing a brush head and a lower cover for receiving a conventional toothpaste tube. The lower cover is formed of a thin pliable material so that, by squeezing the lower cover, sufficient pressure is applied to the toothpaste tube to extrude toothpaste in the customary manner. Due to straight tubular configuration of the lower cover and the clearance between the cover and the toothpaste tube, the toothpaste cannot be sufficiently squeezed out by pressing on the lower cover. Also, the openings on the brush head are not self-closing to prevent the drying of the toothpaste.

Instead of pressing on the handle wall for dispensing toothpaste, U.S. Pat. No. 7,677,827 by Manukian describes a toothbrush attached with a toothpaste tube which is supported by a gripping member. The toothpaste is dispensed to the brush head through an aperture by pressing on the toothpaste tube against the gripping member, which is a non-removable support member extending from the head of the toothbrush. The toothbrush includes a switch to push forward for preventing toothpaste from flowing out of said toothpaste aperture. Since the toothpaste tube is exposed for squeezing, therefore, its deformable wall is not comfortable to use as the handle of the toothbrush. Besides, the aperture in the bristle head is not self-closing, therefore, drying of the toothpaste may occur at the aperture preventing the toothpaste flow to the bristle head.

U.S. Pat. No. 8,647,007 by Kuo describes a pump toothbrush with integrated dispensing platform and disposable bristle head. The pump toothbrush comprises a pump head, a refillable cartridge containing dentifrice, an integrated dispensing platform and a disposable bristle head. The pump head includes an inlet connector for attaching the cartridge, a pumping chamber attached with an elastic compressible button, and a dispensing platform. The dispensing platform contains a flow channel and a self-sealing slit-spout to prevent drying of the dentifrice material at the spout. The refillable cartridge of the pump toothbrush, however, is not reliable for filling by users as air entrapment may occur during the filling process. The presence of air bubbles in the toothpaste cartridge may impact the pumping efficiency and result in pumping failure. Also, a pre-filled toothpaste cartridge using a movable piston is of higher cost than a conventional toothpaste tube which has a sealed bottom end.

U.S. Pat. No. 8,740,490 by Kuo provides an electrical pump toothbrush using a toothpaste cartridge for dispensing dentifrice material. The disclosed configuration is limited to the use of toothpaste cartridge which uses movable piston for compacting the dentifrice material when under a vacuum force. It is not applicable to the use of conventional toothpaste tube. Furthermore, its oscillation mechanism is limited to a single bristle element.

BRIEF SUMMARY OF THE INVENTION

It is an objective of the present invention to provide a pump toothbrush that is attached with a conventional toothpaste tube having a sealed end to dispense toothpaste internally to the top of the bristle head. It is another objective of the present invention to provide a vacuum means to draw toothpaste out of the toothpaste tube into the flow channel of the pump toothbrush. It is another objective of the present invention to provide a rotatable handle mechanism to enable simultaneous attachment of the toothpaste tube and the handle to the pumping mechanism of the pump toothbrush.

It is additional objective of the present invention to provide an electrical pump toothbrush using a rotatable encap connector to fasten a toothpaste tube for dispensing dentifrice material and to swing out the toothpaste tube for replacement. It is further objective of the present invention to provide a dual-rotary electrical pump toothbrush for dispensing dentifrice material to the top of two oscillating bristle heads for high cleaning efficiency.

A pump toothbrush using a conventional toothpaste tube for dispensing dentifrice material to the top of brushhead is described. The pump toothbrush incorporates a brushhead, a pump head, an elastic resilient pump actuator, a self-closing spout and a toothpaste tube. The toothpaste tube is supported by a pair of width-limiting fingers as width retainers to prevent total collapse of tube walls resulting in blocking of flow channel in the toothpaste tube. The fingers are installed in the handle of the pump toothbrush to keep the flow channel open for the dentifrice material to exit the tube opening under vacuum force created by repeated pumping actions. The manual pump toothbrush uses a detachable handle having an oval-shaped recess to accommodate the oval-shaped shoulder of the toothpaste tube. The pump head includes a dispensing platform having a flow channel connected to the pump actuator and the toothpaste tube. The distal end of the dispensing platform is attached with a slit spout and mounted with the detachable brushhead. Pressing on the pump actuator forces dentifrice material flow from the pump head to the top of the brushhead, and releasing the pump actuator can cause rebound of the elastic pump actuator and create a vacuum force to draw the toothpaste from the toothpaste tube into the pump head. Repeated pumpings can empty the toothpaste tube without its flow channel blocked.

The toothpaste tube support configuration is applicable to an electrical pump toothbrush which has a non-detachable handle. A sonic electrical pump toothbrush has a pump head with a vibratory dispensing platform and an endcap connector attached with a toothpaste cartridge.

The toothpaste cartridge may be generally a toothpaste tube or a cylindrical tube with a movable piston as described in U.S. Pat. No. 8,647,007 by Kuo. The endcap connector can be rotated to swing out the toothpaste cartridge from the handle for easy replacement. Preferably the toothpaste cartridge is a toothpaste tube. The handle includes a dentifrice compartment containing the toothpaste tube, and an electrical compartment containing a power source, a motor, and electrical components. The bottom end of the pump head has a concave hemispheric surface forming an interface with the convex hemispheric surface of the dome-shaped endcap connector in rotational intimate contact. A rubber O-ring is positioned at the orifice of the endcap connector for ensuring sealing of the dentifrice material not leaking out of the interface.

Preferably the endcap connector is hinge-supported with grooves on its outer surface and pins on the inner surface of the concave hemispheric surface at the bottom end of the dispensing platform. The grooves are designed for fastening the encap and aligning the toothpaste tube at the home position for dispensing the dentifrice material, and for dislodging the endcap connector when rotated to a wide angle from the home position. At the home position the toothpaste tube is supported by the width-limiting fingers. The detachment of the endcap enables cleaning of the endcap connector if necessary.

Also provided in the present invention is a dual-rotary electrical pump toothbrush using a toothpaste tube. The dual-rotary model is advantageous in achieving high brushing efficiency and focusing vibration energy only on the brush head without imparting vibration on the handle. The pumping mechanism and the support structure for the toothpaste tube are similar to that of the sonic model. The brushhead has two rotary bristle elements. Each rotary bristle element has a through hole for mounting on a slit shaft spout attached to the dispensing platform. The two rotary bristle elements are engaged by gear teeth with one driven by the oscillating shaft connected to a motor, which is mounted with a biased wheel for vibration. When the pump actuator is depressed, the dentifrice material is dispensed from the pump head to exit from the two shaft spouts to the top of the two rotary bristle elements.

The dual-rotary brushhead is replaceable. Its attachment on the dispensing platform is accomplished by using a pair of extended arms with each arm having an outward latch at its end. The dispensing platform has recesses to accommodate the insertion of the latch arms. When engaged, the latch on each arm is locked with the opening on each side of the dispensing platform. The detachment of the brushhead is facilitated by using a detachment tool to press on the latches exposed at the side openings of the dispenser platform. With the latches depressed the brushhead can be pulled out from the dispensing platform easily. Furthermore, the dual-rotary brushhead is designed for assembly. Both bristle elements are pre-implanted with bristles and they are front mounted on a support bracket then locked in place by a gear cover. The gear cover is inserted into the slots at the central portion of the support bracket. The support bracket has guide features to allow free rotation of the bristle elements without touching the shaft spouts.

BRIEF DESCRIPTION OF THE DRAWINGS

These and other features, aspects and advantages of the disclosure will become better understood with regard to the following embodiments and accompanying drawings.

FIG. 1b shows a front, a side and a top view of the toothpaste tube of FIG. 1a.

FIG. 3a is a cross-section view of the toothpaste tube of FIG. 1a with sidewalls pinched by support fingers.

FIG. 3b is a cross-section view of the toothpaste tube of FIG. 3a under a vacuum force causing depression of tube walls.

FIG. 3c is a cross-section view of the toothpaste tube of FIG. 3b under a vacuum force causing further depression of tube walls without blocking of the flow channel.

FIG. 4a is a front section view of a manual pump toothbrush using a toothpaste tube of FIG. 1a.

FIG. 4b shows an explosive view of the pump toothbrush of FIG. 4a.

FIG. 5a is a perspective view of the handle of the manual pump toothbrush of FIG. 4a.

FIG. 9b shows the dual-rotary brushhead detached from the electrical pump toothbrush of FIG. 9a.

FIG. 10a shows the gear engagement between the two rotary bristle elements of the dual-rotary brushhead of FIG. 9a.

FIG. 10b is a side view of the dual-rotary brushhead showing the support bracket holding the two rotary bristle elements and having latches to engage with the dispensing platform.

FIG. 11a is a front cross-section view of the engagement of the dual-rotary brushhead and the dispensing platform of FIG. 9a.

FIG. 11b shows the cross-section of the dispensing platform of FIG. 11a.

FIG. 12a is a perspective view of the alignment of the dual-rotary brushhead with the dispensing platform for engagement.

FIG. 12b shows the engagement of the dual-rotary brushhead with the dispensing platform.

FIG. 13a shows an explosive view of the parts of the dual-rotary brushhead.

FIG. 13b is a perspective view of the assembly of the parts of the dual-rotary brushhead.

FIG. 13c shows the assembly of the parts of the dual-rotary brushhead.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. Conventionally, the drawings are shown only for illustration, in which the components are not represented in their actual size. For better understanding, the sizes of various components can be enlarged or reduced. Same or similar components described hereinafter are denoted by the same or similar reference symbol.

Toothpaste Tube

A conventional toothpaste tube is formed (manufactured) by using a section of a cylindrical tube of constant diameter with the top end bonded with an injection molded shoulder having a threaded neck with outlet opening enclosed by a cap. And the opposite or the bottom end is clamped or flattened to seal the tube after filling the tube with dentifrice material. The manufacturing and filling of a toothpaste tube is well known in the art. In a conventional toothbrush tube the upper and a central portion of the toothbrush toward the top end maintains straight profile but the lower portion toward the bottom end has flared profile. The width of the flattened bottom end is half of the circumference length of the top end. Also, in a conventional toothpaste tube the top end is of circular shape. For the applications of the present invention, the top end is of oval shape for function and for fitting into a compact size of the handle of a pump toothbrush. In an oval shape, there are the major width and the minor width as will be described below.

Figure 1B:
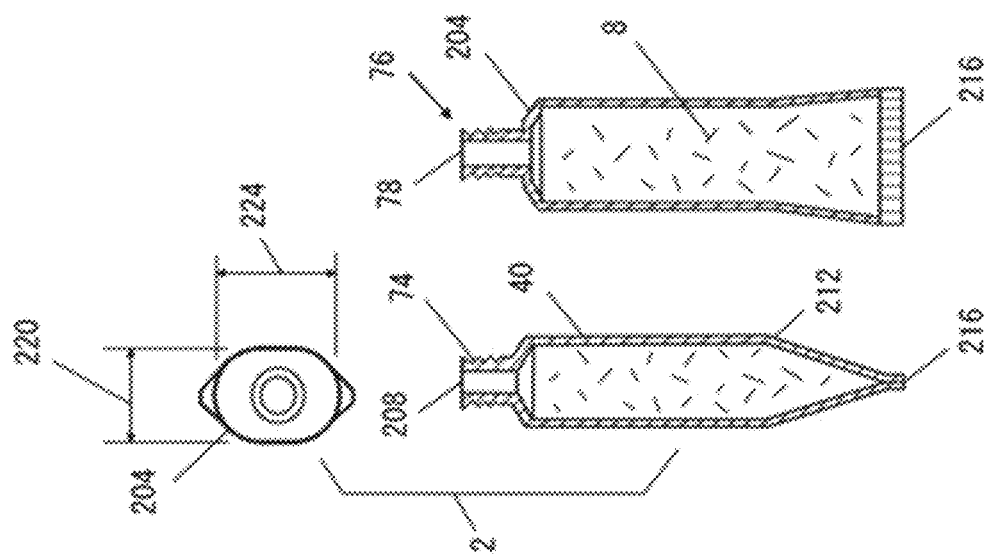
Figure 1A:
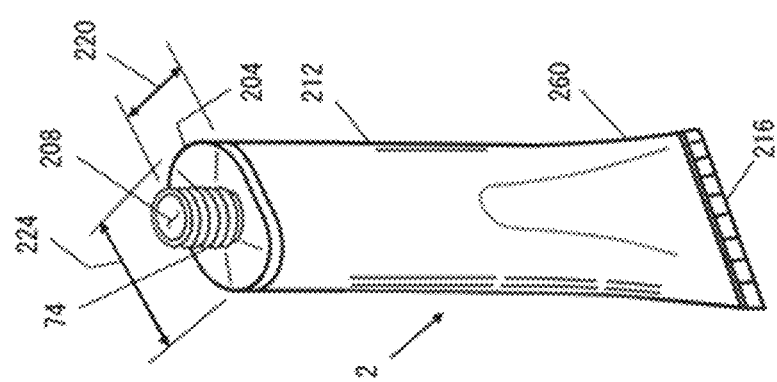
FIG. 1a is a perspective view of a toothpaste tube (having an oval-shaped shoulder).

Referring to FIG. 1a and FIG. 1b, toothpaste tube 2 of the present invention includes shoulder 204, threaded neck 74 with outlet opening 208, and collapsible side wall 212 with flattened and sealed bottom end 216. Flatten bottom end 216 is wider than the maximum width of shoulder 204. Shoulder 204 and threaded neck 74 is an injection molded plastic part. Preferably the shoulder is of oval-shape for placing inside the handle of a pump toothbrush as will be described in a later section. Oval-shaped shoulder 204 has two parallel edges forming minor or short width 220 and two rounded edges forming major or long width 224. Sidewall 40 is made of non-elastic material such as aluminum foil with thickness and stiffness suitable for collapsing of the sidewall when dentifrice material 8 inside the toothpaste tube is drawn out of the tube when a vacuum force is applied at the outlet of the toothpaste tube. Preferably, the thickness of the tube sidewall is about 0.1 mm for aluminum foil material. Aluminum foil is chosen for collapsibility without spring back to its original shape. A tube sidewall of non-elastic material does not spring back after a vacuum force is released from the tube opening. A toothpaste tube of plastic wall material is not suitable for pump toothbrush applications because a plastic sidewall may rebound after a vacuum force is released from the tube opening.

Figure 2A:
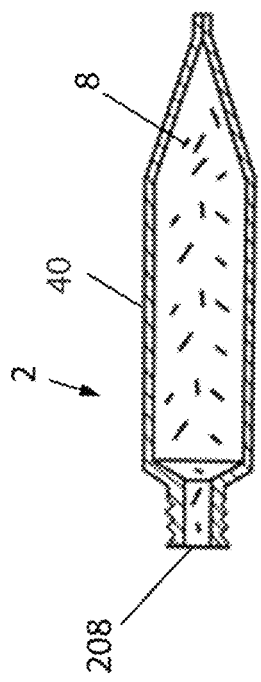
FIG. 2a is a front section view of the toothpaste tube of FIG. 1a full of toothpaste.
Figure 2B:
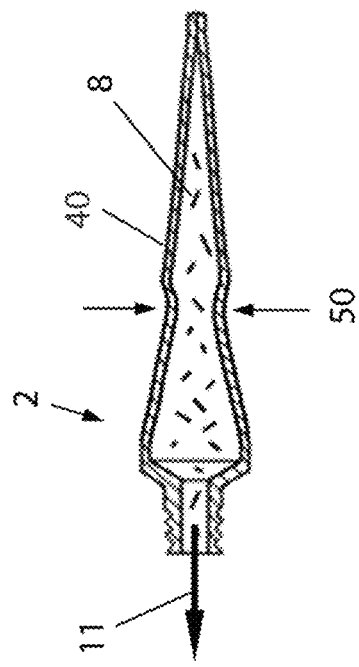
FIG. 2b is a front section view of the toothpaste tube of FIG. 2a under a vacuum force causing depression of tube walls.
Figure 2C:
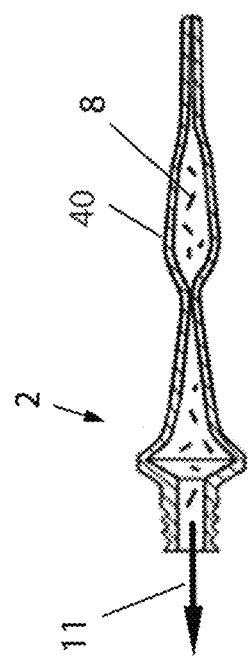
FIG. 2c is a front section view of the toothpaste tube of FIG. 2b under a vacuum force causing tube walls totally collapsed and blocking of the flow channel.

FIG. 2a shows a front section view of the sidewalls 40 of toothpaste tube 2 which is full of dentifrice material 8 (in full shape). Under vacuum force 11 applied at the outlet opening 208 of toothpaste tube 2, the outflow of the dentifrice material results in the collapsing of sidewall as shown in FIG. 2b, which is under the atmospheric pressure of the environment. Repeated vacuum force (by pumping or dispensing actions by pressing and releasing the resilient button) can further withdraw the dentifrice material from the toothpaste tube with tube sidewall 40 sufficiently collapsed in transverse direction 50 and blocking the flow channel 45 as shown in FIG. 2c. When mounted in a pump toothbrush, the vacuum force can be created by releasing a pump actuator from a depressed position (for dispensing the dentifrice material) as will be described in a later section.

Toothpaste Tube with Support Fingers

To prevent total collapsing of the sidewalls and blocking of the flow channel, the central part of the toothpaste tube can be restricted from widening or flattening so as to form a narrow flow channel. FIG. 3a shows the use of width support bracket 61 as width retainer to limit the widening of the original width of tube sidewall 40. Support bracket 61 has two fingers with each finger 63 having tip 65 as a protruding rib that slightly pinches into the respective lateral sidewall 67 of the toothpaste tube. The indentations 69 on the sidewalls caused by the pinching can facilitate the folding of the toothpaste sidewalls in concave shapes in the normal direction under vacuum force as shown in FIG. 3c. Further withdrawing the dentifrice material by repeated vacuum force can sufficiently empty the toothpaste tube without blocking the flow channel 71 as shown in FIG. 3c.

The collapsibility under vacuum force and prevention of total collapse and blocking of the flow channel can be demonstrated by sucking a toothpaste tube by mouth at the opening to withdraw the dentifrice material and holding the toothpaste tube simultaneously by fingers on the lateral sidewalls. The latter action prevents flattening of the central portion of the toothpaste to allow the flow channel open for the exiting flow of the dentifrice material. Such a width-limiting support bracket can be built in the handle of a pump toothbrush containing a toothpaste tube.

Pump Toothbrush with Rotatable Handle

Figure 4B:
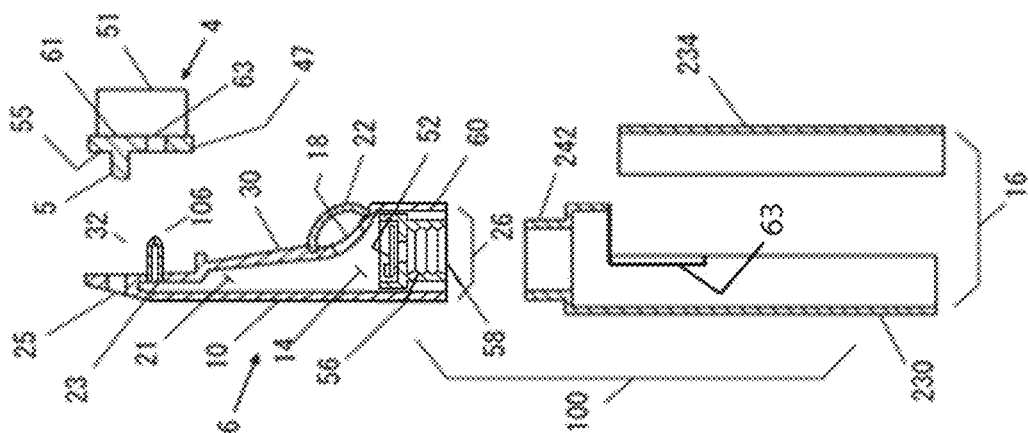
Figure 4A:
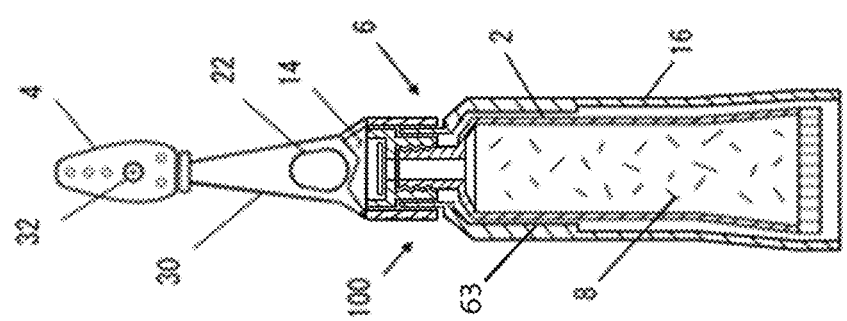

A manual pump toothbrush of this invention includes a pump head, a detachable bristle head, a toothpaste tube and a handle. FIG. 4a shows an assembled pump toothbrush 100 with toothpaste tube 2 and bristle head 4. The width of the toothpaste tube is restricted by the width-limiting fingers 63 (referring to FIG. 3a), which are shown in FIG. 4a and FIG. 4b. FIG. 4b shows an explosive view of the pump tootbrush 100 with toothpaste tube 2 shown in FIG. 1a. In FIG. 4b pump head 6 comprises side wall 10, pumping chamber 14 having opening 18 attached with pump actuator 22, inlet connector 26, and dispensing platform 30 which has flow channel 21 attached with spout 32. Both inlet connector 26 and dispensing platform 30 are supported by pump head sidewall 10. Inlet connector 26 is formed by sidewall 10 and valve seat 56 with inner threads 58 for mounting toothpaste tube 2.

Figure 5D:
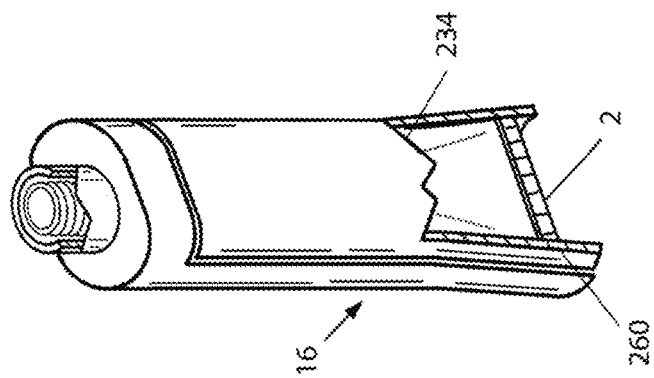
FIG. 5d is a perspective view of an assembled handle of FIG. 5b with the lid enclosing the toothpaste tube.
Figure 5C:
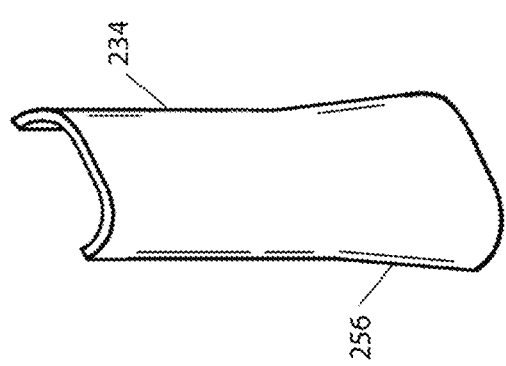
FIG. 5c is a perspective view of a lid to enclose the toothpaste tube in the handle.
Figure 5B:
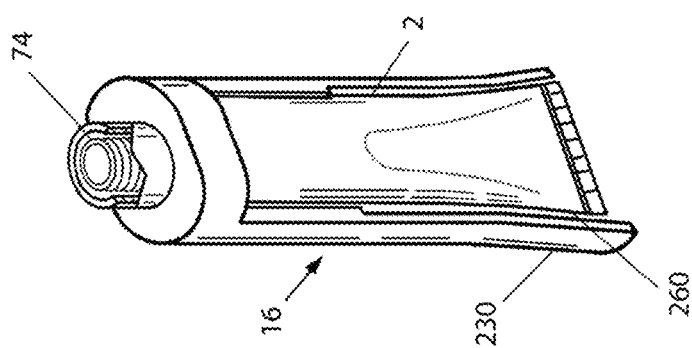
FIG. 5b shows the handle of the toothbrush of FIG. 5a inserted with a toothpaste tube with sidewalls constrained by support fingers.
Figure 5A:
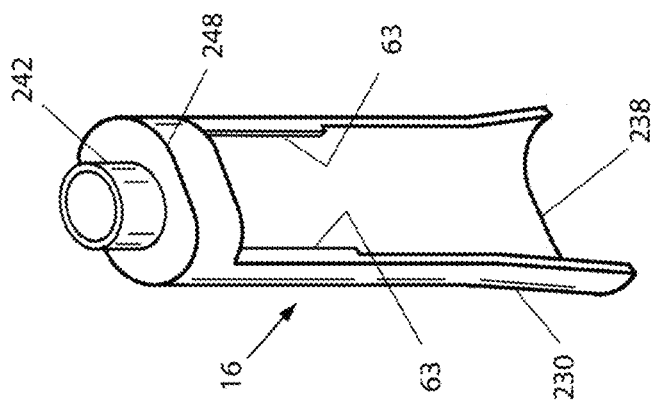

The installing and removing of toothpaste tube 2 having an oval-shaped shoulder can be facilitated by using rotatable handle 16 shown in FIG. 5a. As the width of the flattened bottom end 216 of toothpaste tube 2 being wider than the long width 224 of shoulder 204 (shown in FIG. 1a), handle 16 of the present invention is tailor designed to accommodate the flared shape of the toothpaste tube with spatial efficiency. As shown in FIG. 5b and FIG. 5c, handle 16 includes support frame 230 and lid 234 attached to the support frame for enclosing the toothpaste tube 2 with bottom end 238 of the handle exposed to the atmosphere of the environment. Support frame 230 includes hollow neck 242 having circular wall, an oval-shaped shoulder 248 having a recess of oval shape for inserting threaded neck 74 and oval-shaped shoulder 204 (shown in FIG. 1a) of toothpaste tube 2. Generally the mating of two same non-circular shapes enables the use of the handle as a driver to rotate the toothpaste tube to screw on the pump head.

Lid 234 is designed for mating with sidewall of handle frame 230 to form a cavity for receiving a full toothpaste tube. Furthermore, the handle has flared bottom end 256 to fit flared portion 260 of the toothpaste tube. FIG. 5d shows assembled handle 16 of FIG. 5b and FIG. 5c enclosing toothpaste tube 2. When toothpaste tube 2 is fully inserted inside handle 16, the top end of threads 74 of the toothpaste tube is flush with the top end of handle neck 242. Referring to FIG. 5d and FIG. 4b, after engaging the annular wall of neck 242 of the handle with the annular gap in inlet connector 26 of the pump head, handle 16 can be rotated to screw on the toothpaste tube on valve seat 56 of pump head 6.

Dispensing Platform & Slit Spout

The present invention uses a slit spout to dispense dentifrice material to a disposable brushhead. A detailed description of the structure and function of a slit spout is given in U.S. Pat. No. 8,647,007 by Kuo. The slit spout is forced to open by exiting dentifrice material under the pumping pressure when the pump actuator, which is in a form of elastic compressible button, is depressed. The slit spout closes by itself due to the resiliency of the spout material after the elastic button is released. The slit spout is self-closing that prevents backflow of air into the flow channel when a vacuum force is created in the flow channel as a result of the actuator being released from a depressed position.

Pump Toothbrush with Toothpaste Support Fingers

Figure 6C:
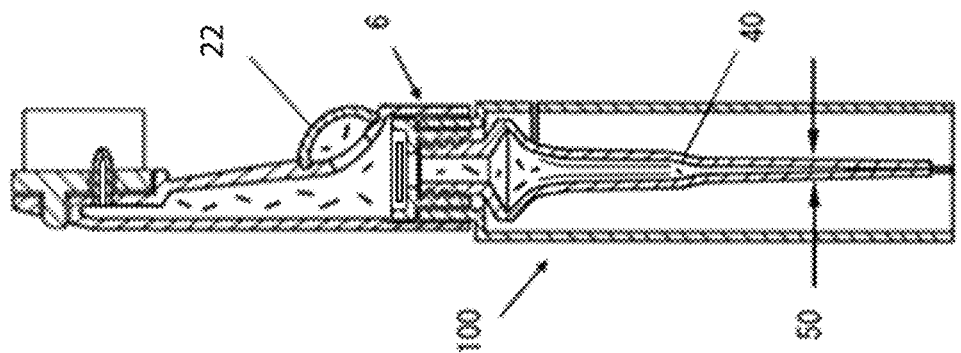
FIG. 6c shows the depression of the toothpaste tube walls without blocking the flow channel.
Figure 6B:
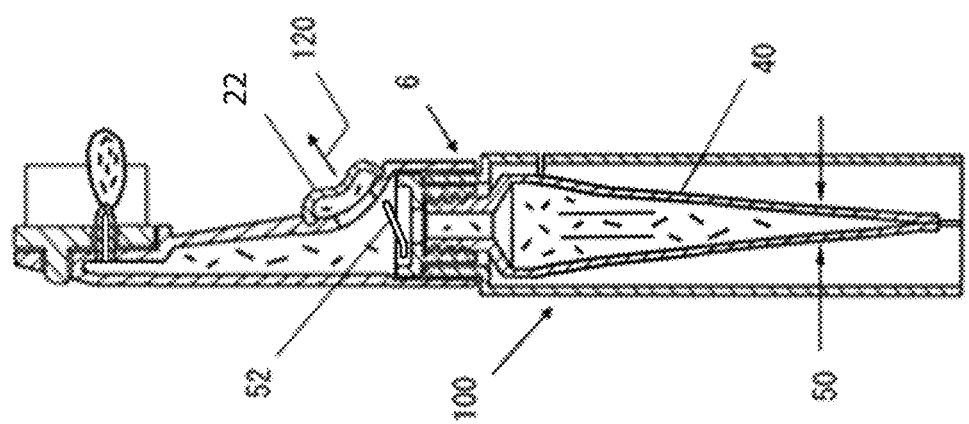
FIG. 6b shows the dispensing action of the pump toothbrush of FIG. 6a with the rubber button depressed.
Figure 6A:
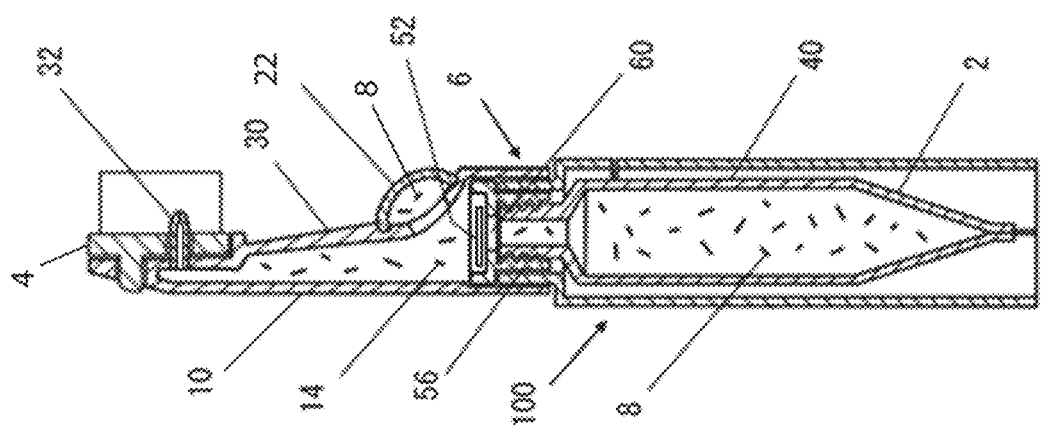
FIG. 6a is a front cross-section of a pump toothbrush of FIG. 4a prior to dispensing toothpaste.

Referring to FIG. 6a, the pump toothbrush of FIG. 4a having toothpaste tube 2 attached to valve seat 56 and bristle head 4 attached to dispensing platform 30. The width of the toothpaste tube is restricted by width-limiting fingers (not shown). When actuator 22 is depressed as shown in FIG. 6b, a pumping force is applied to the dentifrice material 8 inside pump chamber 14 causing the dentifrice material to exit from dispensing platform 30. As the actuator, which is a rubber button, is released from the depressed position, a vacuum force is created inside the pumping chamber causing check valve 52 to open and dentifrice material 8 in the toothpaste tube to flow into the pump chamber 14. The outflow of the dentifrice material creates a vacuum force inside the toothpaste tube that results in the depression of the sidewall 40 of the toothpaste tube in the normal direction 50, which is perpendicular to the longitudinal direction of the toothpaste tube. The vacuum force is suction force that pulls the dentifrice material forward in a packed state satisfying the continuity of material condition as the actuator springs back to its original un-depressed position.

Repeated pumping or dispensing actions can withdraw the dentifrice material from the toothpaste tube near empty with the sidewall sufficiently depressed without blocking the flow channel as shown in FIG. 6c.

Sonic Electrical Pump Toothbrush

The use of a toothpaste tube is applicable to electrical pump toothbrushes. In the afore-mentioned manual pump toothbrush, the detachable handle includes only a toothpaste tube. In a sonic electrical pump toothbrush of the present invention, the handle includes a dentifrice compartment containing the toothpaste cartridge, and an electrical compartment containing a power source and a motor, which imparts vibration of the brushhead attached to the dispensing platform. Here sonic electrical pump toothbrush refers to an electrical pump toothbrush that the brushhead and the dispensing platform vibrate together. The toothpaste tube is fastened to a rotatable encap connector and can be swing out for replacement.

Figure 7C:
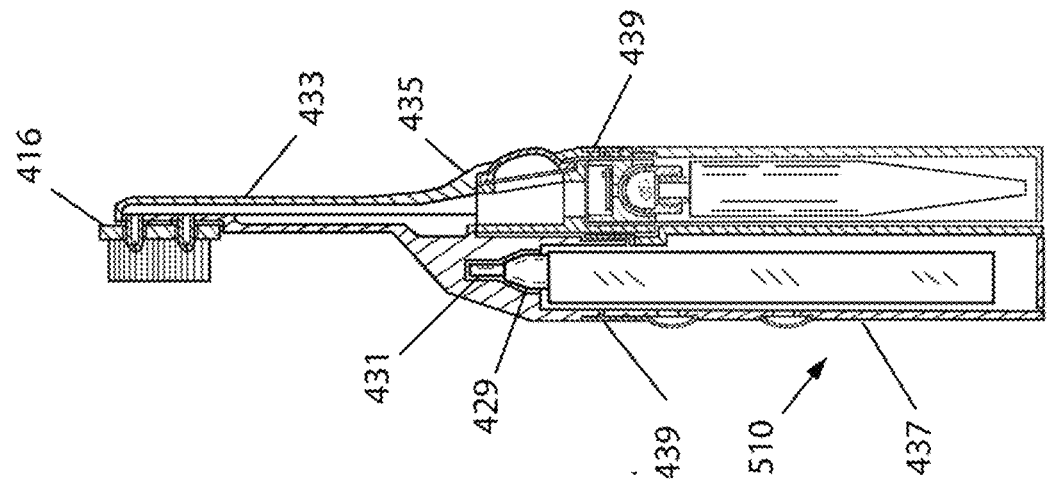
FIG. 7c shows a front section view of a sonic electrical pump toothbrush using a motor assembly and an endcap connector attaching a toothpaste tube.
Figure 7B:
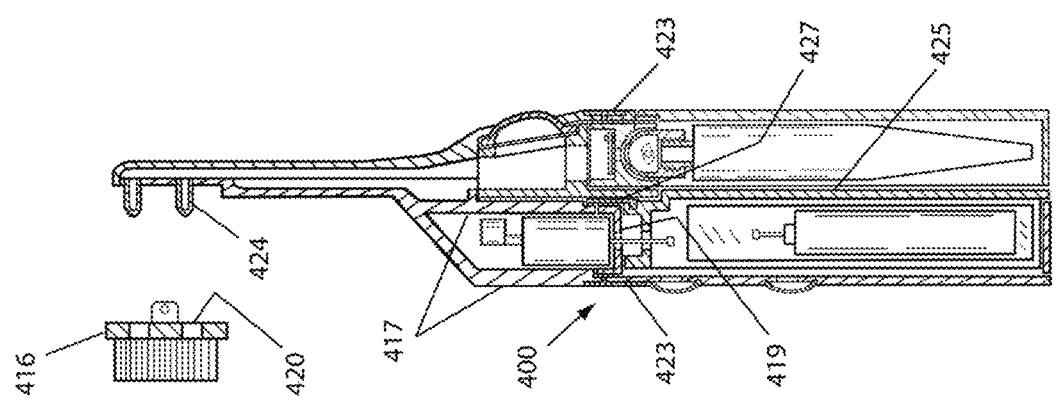
FIG. 7b shows the electrical pump toothbrush of FIG. 7a with the brushhead detached from the dispensing platform.
Figure 7A:
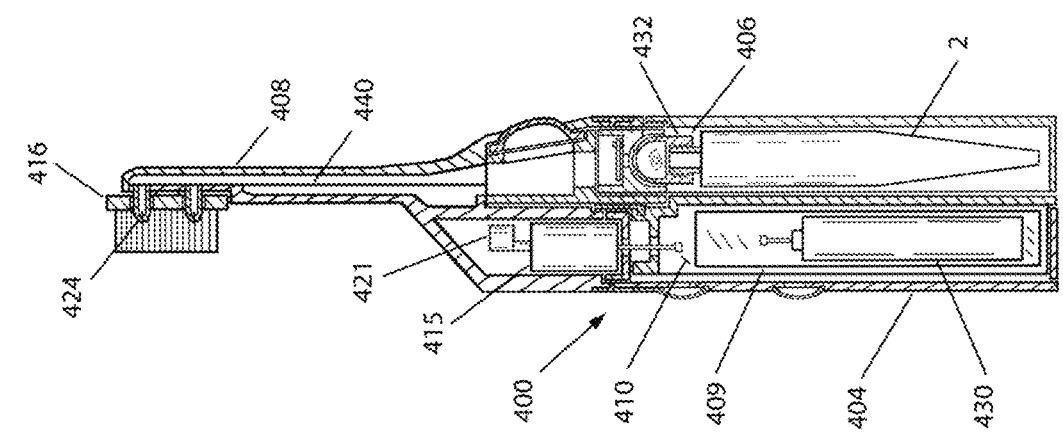
FIG. 7a shows a front section view of a sonic electrical pump toothbrush using a DC motor-vibrator (with a biased wheel) and an endcap connector attaching a toothpaste tube.

Specifically, FIG. 7a shows sonic electrical pump toothbrush 400 comprises handle 404, vibratory dispensing platform 408 having a pair of slit valves 424 and brushhead 416 having a pair of through hole4 420 mounting on slit valves 424. Handle 404 further includes dentifrice compartment 406 containing toothpaste tube 2 attached to encap connector 432 and electrical compartment 410 containing battery 430, electrical circuitry 409 and other electrical components. Motor 415 is pressed in between sidewalls 417 and supported by the motor seat 417 at the bottom of the motor to ensure that the rotation of the biased wheel 421 can effectively impart the vibration of the dispensing platform 408 and brushhead 416. In manufacturing the dispensing platform is bonded to the handle by a rubber layer 423 around the periphery of the junction. Furthermore, the partition wall 425 between the electrical compartment 410 and the toothpaste tube compartment 406 is inserted with a rubber molding part 427 to prevent water getting into the electrical compartment from the toothpaste compartment. These rubber layers can isolate or reduce the vibration on the handle to achieve more comfortable brushing. The function of endcap connector 432 will be described in a later section.

FIG. 7b shows that brushhead 416 is detachable for replacement. The fastening mechanism of the detachable brushhead will be described in a later section. Optionally, sonic electrical pump toothbrush 510 may use a motor assembly 429 having an output shaft 431, such as a magnetic levitation sonic motor, to impart vibration of the dispensing platform 433 and brushhead 416 as shown in FIG. 7c. Motor assembly 429 contains one or more bumpers (not shown) connected to output shaft 431. The output shaft is mounted to vibratory pump head 435, which is bounded to the handle 437 by rubber molding 439 around the periphery of the junction. The mechanism of the motor assembly comprising bumpers and an output shaft is well known in the art, as described in US Provisional Patent Application Number 20150327965 by Garrigues.

Endcap Connector

Figure 8C:
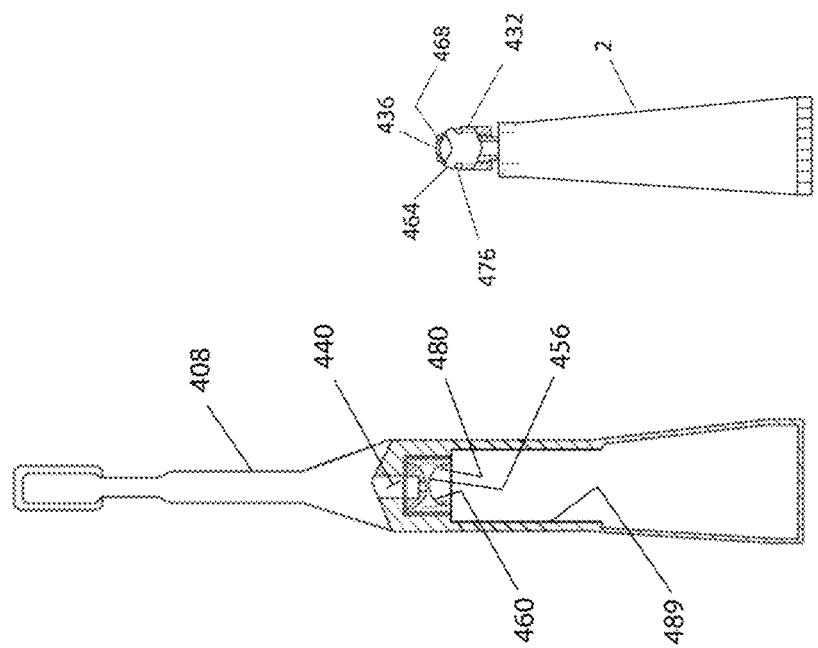
FIG. 8c shows the endcap connector being detached from the handle.
Figure 8B:
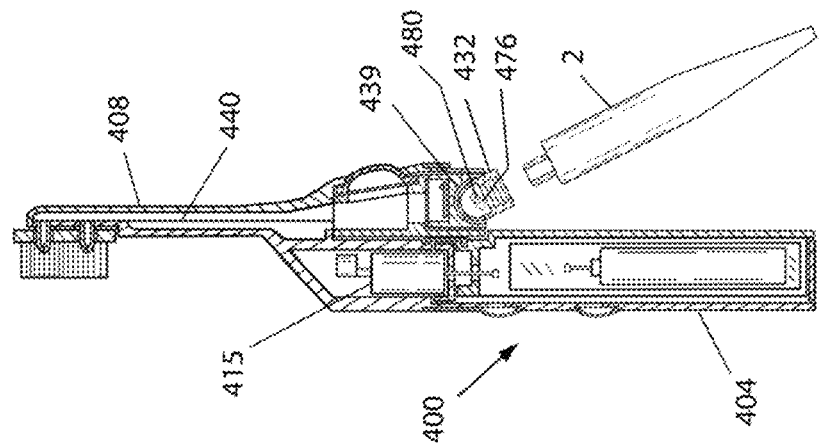
FIG. 8b is a front cross-section view of the electric pump toothbrush of FIG. 7a with the endcap connector rotated to swing out the toothpaste tube for replacement.
Figure 8A:
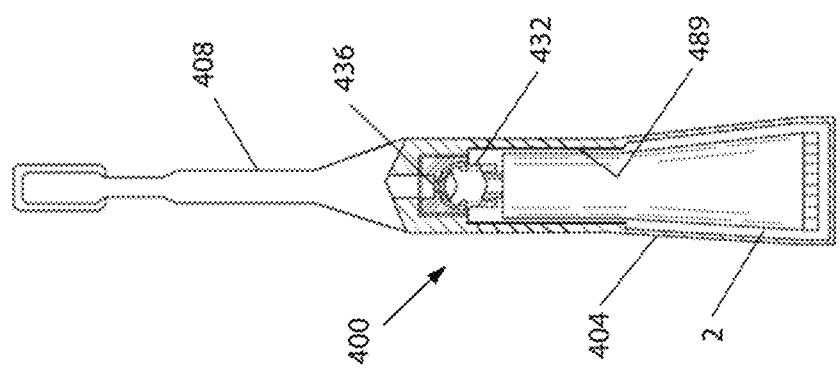
FIG. 8a is a side view of the electric pump toothbrush of FIG. 7a showing the toothpaste tube with sidewalls constrained by support fingers.

In an electrical pump toothbrush of the present invention, a toothpaste tube can be mounted on an endcap connector, as shown in FIG. 7a, and rotated away from the handle for easy replacement. As shown in FIG. 8a, which is a side cross-section view of the sonic electrical pump toothbrush 400 of FIG. 7a, toothpaste tube 2 is threaded to dome-shaped endcap connector 432, which has orifice 436. Endcap connector 432 is attached to the bottom end 456 (shown in FIG. 8c) of valve seat 439. The bottom end has concave hemispheric surface 460 forming an interface with convex hemispheric surface 464 of the dome-shaped endcap connector 432 in rotational intimate contact. Rubber O-ring 468 is positioned at the orifice 436 of the endcap connector 432 for ensuring sealing of the dentifrice material not to leak out of the interface. When the toothpaste tube 2 is positioned at its home position as shown in FIG. 8c. At the home position endcap orifice 436 is open and aligned with flow channel 440. As shown in FIG. 8a and FIG. 8b, endcap connector 432 is hinge-supported with grooves 476 (also shown as dotted parallel lines on FIG. 8a) on its outer surface and pins 480 (also shown as dotted circle on FIG. 8b) on the inner surface of the concave hemispheric surface 460 at the bottom end of the dispensing platform. The endcap connector can be rotated to swing out toothpaste tube from handle 404 for easy replacement as shown in FIG. 8b. Further shown in FIG. 8b, the length and angle of grooves 476 are designed for fastening the endcap connector and aligning the toothpaste tube at the home position for dispensing the dentifrice material. The home position is also when the toothpaste tube is totally positioned inside the handle. When the endcap connector is rotated to a predetermined wide angle, preferably nearly 90 degree from the home position, the endcap connector with the toothpaste tube connected can be dislodged from the bottom end of the dispensing platform as shown in FIG. 8c. A detached endcap is for ease of cleaning after long use if necessary. Similarly to the pump toothbrush described in FIG. 4a, the toothpaste tube is supported by width-limiting fingers 489 as shown in FIG. 8a and FIG. 8c.

Dual-Rotary Electrical Pump Toothbrush

Nevertheless, a vibrating dispensing platform or a vibrating brush neck for a conventional sonic electrical toothbrush may shock teeth when touched during brushing. A user needs to keep the dispensing platform or the neck away from touching teeth during brushing. To overcome the drawback, an electrical pump toothbrush may use a rotary bristle element to avoid vibration on a dispensing platform.

Figure 9B:
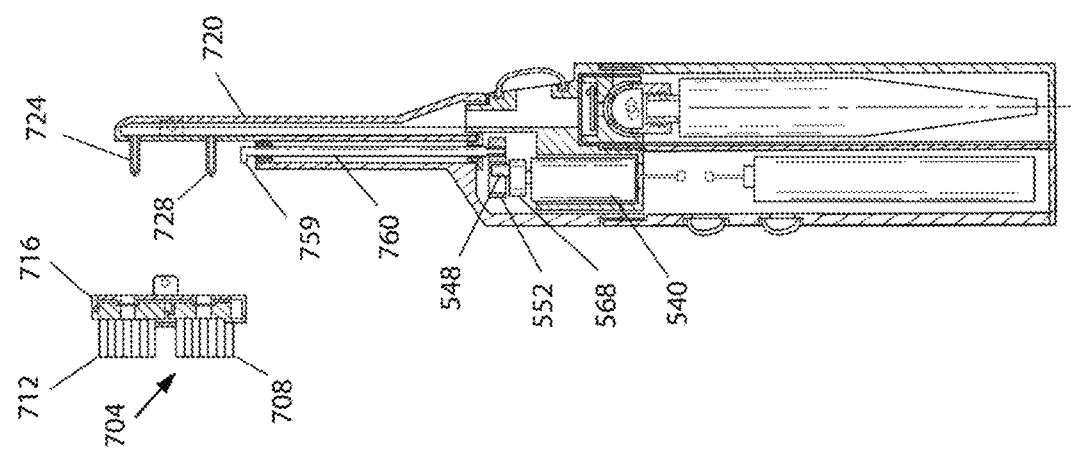
Figure 9A:
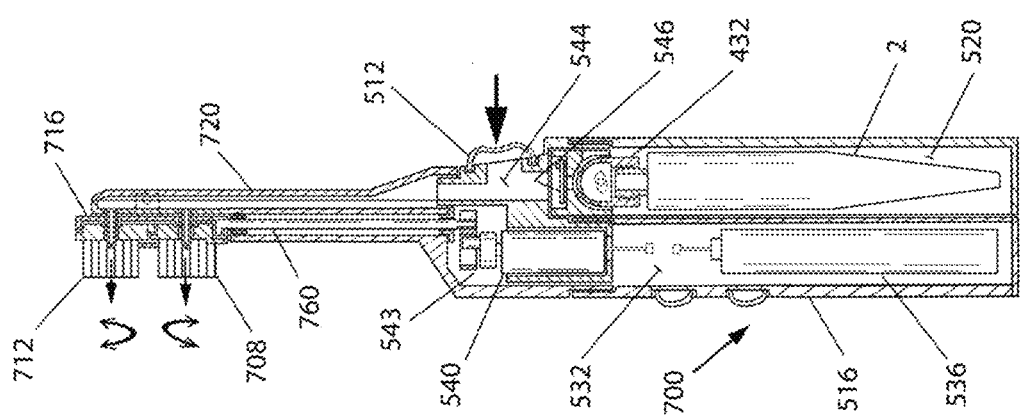
FIG. 9a shows an electrical pump toothbrush of the present invention having a dual-rotary brushhead.

However, to increase cleaning efficiency, a dual-rotary electrical pump toothbrush is provided in the present invention. FIG. 9a describes electrical pump toothbrush 700 having dual-rotary brushhead assembly 704, which includes two rotary bristle elements 708, 712, and support bracket 716. Dual-rotary brushhead 716 is detachable as shown in FIG. 9b. Its dispensing platform 720 is attached with two shaft spouts 724, 728 mounted with rotary bristle elements 712, 708, respectively. Each shaft spout serves as a shaft for the rotary bristle element mounted, and as a slit valve for dispensing the dentifrice material.

The handle 516 includes dentifrice compartment 520 containing toothpaste tube 2 fastened to endcap 432 and electrical compartment 532 containing power source 536, motor 540 and an oscillation mechanism 543 to impart oscillation of the rotary bristle elements. The dispensing action is accomplished by pressing on the actuator 512, which is in the form of rubber button attached to a pump chamber 544. The functions of rubber button 512, pump chamber 544, check valve 546, endcap 432 attaching with toothpaste tube are similar to that described in FIG. 7a, FIG. 7b for the sonic electrical pump toothbrush. The dual-rotary electrical pump toothbrushes 700 uses an oscillation mechanism that comprises motor 540, shaft 548 and cam 552 for imparting oscillation motion of the rotary bristle element 712 without causing vibration of its dispensing platform 720. The practice of using a motor, a shaft and a cam for causing oscillation of a rotary brushhead is well known in the art such as described in U.S. Pat. No. 8,740,490 by Kuo.

Specifically, first rotary bristle element 708 and second rotary bristle element 712 are engaged by gear teeth with first bristle element 708 oscillated by shaft 760, which is mounted on cam 552 driven by biased wheel 568 of motor 540. Further shown in FIG. 10a, first rotary bristle element 708 and second rotary bristle element 712 are engaged by gear teeth 756, 758, which are molded in base 755, 757 of bristle elements 708, 712, respectively. The second rotary bristle element is driven by first rotary bristle element in the opposite direction. Furthermore, the positions of both rotary bristle elements are retained by outer guides 763, 765 on support bracket 716 as shown in FIG. 10a and FIG. 10b. The outer guides 763, 765 engage with circular slots 775, 777 on base walls of bristle elements to enable free rotation around shaft spouts 724, 728 with sufficient clearance to avoid friction with the shaft spouts. For assembly the gears are covered by gear cover 781, which has two arms 783, 785 inserted into the edge slots 793, 795 in the central portion of the brush bracket as shown in FIG. 10a. The assembly of the brushhead will be further described in a later section.

Latches Engagement

Figure 11B:
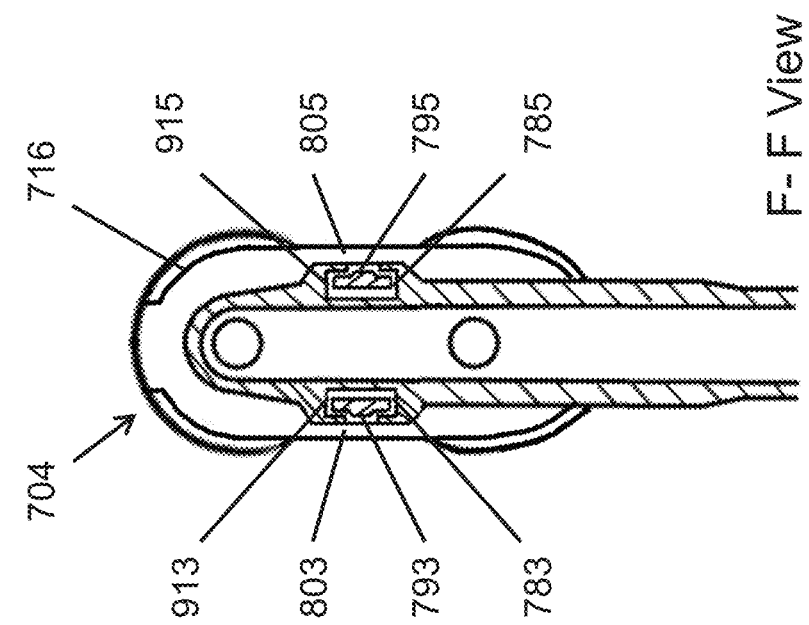
Figure 11A:
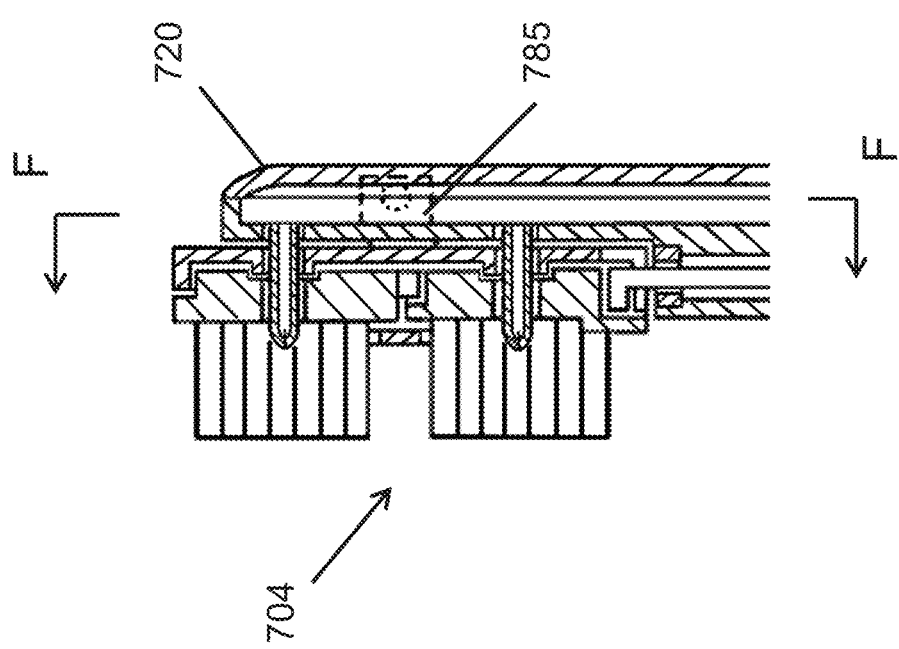

An embodiment of an electrical pump toothbrush of present invention is the fastening mechanism of replaceable brushhead 704. As shown in FIG. 10a and FIG. 10b, brushhead bracket 716 has a pair of extended arms 783, 785 with outward latches 793, 795 at their ends, respectively. FIG. 11a and FIG. 11b show the dual-latch mechanism that the engagement of the latch arms 783, 785 with dispensing platform 720, which has recesses 913, 915 to accommodate the insertion of the latch arms. When engaged, the latches on both arms are locked with openings 803, 805 on both sides of the dispensing platform. The alignment and the insertion of brushhead 704 on dispensing platform 720 are further shown in FIG. 12a and FIG. 12b, in which latch arms 783, 785 are aimed to insert into recesses 913, 915 for fastening. In manufacturing the latch arms of the support bracket and the side openings of the dispensing platform can be made by injection molding techniques. To facilitate the detachment of the brushhead, a detachment tool may be used to press on the latches exposed at side openings 803, 805 of the dispensing platform. With the latches depressed the brushhead can be pulled out from the dispensing platform easily. It is noted here that the fastening mechanism as described above is applicable to the sonic models as shown in FIG. 7a and FIG. 7c.

Assembly of Dual-Rotary Brushhead

Furthermore, another embodiment of the present invention is a design for assembly of the brushhead. FIG. 13a shows an explosive view of the parts of dual-rotary brushhead 704. Both bristle elements 708, 712 are pre-implanted with bristles. Preferably second bristle element 712 has a segment of four gear teeth 758 on its base 757. First bristle element 708 has a segment of three gear teeth 756 and a notch 799 under its base 755 for accommodating the angled tip 759 (shown in FIG. 9b and FIG. 12a) of the oscillating shaft 760. The size of the gear teeth is determined not to have the outer teeth touch the side walls of the support bracket under the oscillation range, which requires not equal numbers of gear teeth on the two bristle elements. Optionally the gear teeth of the two bristle elements can be two on three, or one on two depending on the gear size chosen. Both bristle elements have outer recesses 775, 777 for engaging with guide ribs on the support bracket, respectively. The assembly steps are illustrated in FIG. 13b. The bristle elements are aligned for front loading on the support bracket. The support bracket has protruding rings 791, 794 for locating the through holes 792, 797 of the bristle elements. After the bristle elements are seated on top of the locating rings, gear cover 781 is inserted into the slots at the central portion of the support bracket to lock the bristle elements in place as shown in FIG. 13c.

The invention has been described in detail with reference to preferred embodiments and applications thereof. However, it is understood that variations, modifications and applications can be effected within the spirit and scope of the present invention. Applications of the present invention may include dispensing cleaning agents, cosmetic creams, adhesive materials, colorants, medications and drugs, as well as dispensers with applicators for applying the content of a collapsible tube having a sealed end.

| REFERENCES Cite No. | Publication Number | Publication Date | Name of Patentee | Relevant Passages (pages, lines) |
|---|---|---|---|---|
| 1 | U.S. Pat. No. 5,028,158 | Jul. 2, 1991 | Fey; Theodore | Page 1, Absract |
| 2 | U.S. Pat. No. 7,677,827 | Mar. 16, 2010 | Manukian; Oleg | Page 1, Absract |
| 3 | U.S. Pat. No. 8,647,007 | Feb. 11, 2014 | Kuo; Youti | Page 1, Absract |
| 4 | U.S. Pat. No. 8,740,490 | Jun. 3, 2014 | Kuo; Youti | Page 1, Absract |

What is claimed is:

1. A pump toothbrush comprising;
   i. a pump head including; a. a pumping chamber having an opening attached with an elastic pumping actuator, b. a dispensing platform extending from said pumping chamber, said dispensing platform having a flow channel with an outlet opening attached with a slit spout, c. a check valve mounted on a valve seat in flow communication with said actuator,
   ii. a toothpaste tube containing a dentifrice material, said toothpaste tube having an outlet opening, a hollow neck with external threads, a shoulder, a collapsible sidewall with a sealed bottom end,
   iii. a bristle head attached to said pump head, said bristle head having a base attached with bristles and having an opening for inserting with said slit spout to receive the dentifrice material dispensed from said pump head,
   iv. a handle attached to said pump head, said handle has sidewalls with width retainers that enclose and support said toothpaste tube at the collapsible sidewall.

2. The pump toothbrush of claim 1, wherein said toothpaste tube being supported by width retainers to prevent total collapse of the tube walls resulting in the blocking of the flow channel inside said toothpaste tube.

3. The pump toothbrush of claim 1, wherein said shoulder of said toothpaste tube is of oval-shape and said handle is detachable and having an oval-shaped shoulder for fitting said oval-shaped shoulder of said toothpaste tube for rotating said toothpaste tube to screw on said valve seat of said pump head.

4. The pump toothbrush of claim 1, wherein said collapsible sidewall is of thin aluminum material.

5. An electrical pump toothbrush comprising;
   i. a toothpaste cartridge containing a dentifrice material, said toothpaste cartridge having a collapsible sidewall with a sealed bottom end,
   ii. a handle having a dentifrice compartment having sidewalls with width retainers that enclose and support said toothpaste cartridge at the collapsible sidewall and an electrical compartment containing a power source and electrical components,
   iii. a dispensing platform having sidewalls extended from said handle containing a flow channel with an outlet opening at the top end attached with a first slit spout and an inlet opening at the bottom end, s,
   iv. a brushhead attached to said dispensing platform, said brushhead having a first opening for mounting on said first slit spout,
   v. a drive mechanism in electrical communication with said power source, said drive mechanism imparts vibration to said dispensing platform.

6. The electrical pump toothbrush of claim 5, wherein said drive mechanism comprises a motor with a biased wheel situated in said sidewalls of said dispensing platform and in electrical communication with said electrical components and said power source.

7. The electrical pump toothbrush of claim 5, wherein said brushhead has a dual-latch mechanism for mounting on said dispensing platform.

8. The electrical pump toothbrush of claim 5, wherein said toothpaste cartridge is a toothpaste tube.

9. The electrical pump toothbrush of claim 5, wherein said dispensing platform and said handle are bonded by rubber layer at their junction for minimizing vibration on said handle.

10. The electrical pump toothbrush of claim 5, wherein said dispensing platform having a pair of slots with side openings, and said brushhead having a pair of extended arms with latches for inserting into said slots with said latches engaged with said side openings for fastening.

11. An electrical pump toothbrush comprising;
   i. a toothpaste cartridge containing a dentifrice material, said toothpaste cartridge having a collapsible sidewall with a sealed bottom end,
   ii. a handle having a dentifrice compartment having sidewalls with width retainers that enclose and support said toothpaste cartridge at the collapsible sidewall and an electrical compartment containing a power source and electrical components, iii. a dispensing platform having sidewalls extended from said handle containing a flow channel with an outlet opening at the top end attached with a first slit spout and an inlet opening at the bottom end attached with said toothpaste cartridge, iv. a brushhead attached to said dispensing platform, said brushhead comprising a first rotary bristle element, said first rotary bristle element having a drive notch and a through hole mounted on said first slit spout, v. an oscillation mechanism in electrical communication with said power source, said oscillation mechanism including an oscillating shaft driven by a motor and a cam, said oscillating shaft imparts oscillation to said first rotary bristle element.

12. The electrical pump toothbrush of claim 11, wherein said dispensing platform having a second slit spout and said brushhead having a second rotary bristle element with a through hole for mounting on said second slit spout, and said first and second rotary bristle elements are engaged by gear teeth to impart oscillation on said second bristle element.

13. The electrical pump toothbrush of claim 12, wherein said oscillation shaft having an angled tip engaging with said drive notch of said first rotary bristle element.

14. The electrical pump toothbrush of claim 12, wherein said first rotary bristle element and said second rotary element having not equal numbers of gear teeth.

15. The electrical pump toothbrush of claim 12, wherein said first and second rotary bristle elements are mounted on a support bracket with a gear cover inserted onto said support bracket, which has a pair of extended arms with latches for attaching to said dispensing platform.

16. The electrical pump toothbrush of claim 11, wherein said toothpaste cartridge is a toothpaste tube.

* * * * *